United States Patent
Yamamoto

(10) Patent No.: US 8,857,546 B2
(45) Date of Patent: Oct. 14, 2014

(54) IN-WHEEL MOTOR DRIVE DEVICE

(75) Inventor: Ken Yamamoto, Iwata (JP)

(73) Assignee: NTN Corporation, Osaka (JP)

( * ) Notice: Subject to any disclaimer, the term of this patent is extended or adjusted under 35 U.S.C. 154(b) by 43 days.

(21) Appl. No.: 13/811,535

(22) PCT Filed: Jul. 19, 2011

(86) PCT No.: PCT/JP2011/066332
§ 371 (c)(1),
(2), (4) Date: Jan. 22, 2013

(87) PCT Pub. No.: WO2012/011461
PCT Pub. Date: Jan. 26, 2012

(65) Prior Publication Data
US 2013/0119748 A1 May 16, 2013

(30) Foreign Application Priority Data

Jul. 23, 2010 (JP) ................. 2010-165467

(51) Int. Cl.
| | | |
|---|---|---|
| *B60K 1/00* | (2006.01) | |
| *B60K 17/04* | (2006.01) | |
| *B60K 7/00* | (2006.01) | |
| *F16H 1/32* | (2006.01) | |
| *F16H 57/02* | (2012.01) | |
| *F16H 57/028* | (2012.01) | |

(52) U.S. Cl.
CPC ............. *B60K 7/0007* (2013.01); *B60K 17/046* (2013.01); *F16H 2057/02043* (2013.01); *F16H 1/32* (2013.01); *F16H 2001/325* (2013.01); *F16H 57/028* (2013.01)
USPC ....................... 180/65.6; 180/65.51

(58) Field of Classification Search
USPC ..................... 180/65.51, 65.6, 65.7
See application file for complete search history.

(56) References Cited

U.S. PATENT DOCUMENTS 1,421,375 A * 7/1922 Baines ................... 475/175
1,449,351 A * 3/1923 Seeck .................... 74/498
(Continued)

FOREIGN PATENT DOCUMENTS

| JP | 6-48192 | 2/1994 |
|---|---|---|
| JP | 2007-239928 | 9/2007 |

(Continued)

OTHER PUBLICATIONS

International Search Report issued Sep. 13, 2011 in International (PCT) Application No. PCT/JP2011/066332.

(Continued)

*Primary Examiner* — Hau Phan
*Assistant Examiner* — Jacob Meyer
(74) *Attorney, Agent, or Firm* — Wenderoth, Lind & Ponack, L.L.P.

(57) ABSTRACT

An object of the invention is to always maintain an outer pin holder and a housing in a speed reducer section at their predetermined positions, to prevent damage to such components as revolving members, outer circumferential engagers, and motion conversion mechanism upon a large axial load due to turning or sudden acceleration/deceleration, etc., and to eliminate rattling noise caused by the housing and the outer pin holder. A casing immobilizing member which is fixed to an inner surface of a speed reducer section casing and a housing immobilizing member which is fixed to an outer surface of a speed reducer section housing are provided between the speed reducer section casing and the speed reducer section housing. The casing immobilizing member and the housing immobilizing member are bonded with each other via a rubber member.

18 Claims, 16 Drawing Sheets

(56) References Cited

U.S. PATENT DOCUMENTS

| | | | |
|---|---|---|---|
| 1,773,568 A * | 8/1930 | Braren | 475/159 |
| RE17,811 E * | 9/1930 | Braren | 475/168 |
| 2,239,839 A * | 4/1941 | Benson | 475/174 |
| 3,073,184 A * | 1/1963 | Brarern | 475/180 |
| 4,050,331 A * | 9/1977 | Braren | 475/168 |
| 4,297,920 A * | 11/1981 | Richter | 475/168 |
| 4,307,630 A * | 12/1981 | Osborn et al. | 475/159 |
| 4,785,688 A * | 11/1988 | Shiozaki et al. | 475/149 |
| 5,382,854 A | 1/1995 | Kawamoto et al. | |
| 5,616,095 A * | 4/1997 | Pruitt | 475/178 |
| 5,707,310 A * | 1/1998 | Maeguchi et al. | 475/180 |
| 5,829,542 A * | 11/1998 | Lutz | 180/65.6 |
| 6,632,152 B1 * | 10/2003 | Tiufektchian | 475/176 |
| 7,100,734 B2 * | 9/2006 | Segawa | 180/444 |
| 7,214,155 B2 * | 5/2007 | Mueller et al. | 475/5 |
| 7,351,177 B2 * | 4/2008 | Christ | 475/168 |
| 7,527,113 B2 * | 5/2009 | Jenkins | 180/65.51 |
| 7,530,416 B2 * | 5/2009 | Suzuki | 180/65.51 |
| 7,622,836 B2 * | 11/2009 | DeVeny et al. | 310/75 C |
| 7,819,214 B2 * | 10/2010 | Mizutani et al. | 180/65.51 |
| 7,828,095 B2 * | 11/2010 | Murata et al. | 180/65.51 |
| 7,950,483 B2 * | 5/2011 | Murata | 180/65.51 |
| 7,950,484 B2 * | 5/2011 | Moriguchi et al. | 180/65.51 |
| 8,033,943 B2 * | 10/2011 | Suzuki | 475/179 |
| 8,307,931 B2 * | 11/2012 | Akamatsu | 180/65.51 |
| 8,336,652 B2 * | 12/2012 | Suzuki | 180/65.51 |
| 8,360,186 B2 * | 1/2013 | Yamamoto et al. | 180/65.51 |
| 8,393,424 B2 * | 3/2013 | Makino et al. | 180/65.51 |
| 8,403,794 B2 * | 3/2013 | Suzuki | 475/179 |
| 8,424,625 B2 * | 4/2013 | Ishii | 180/65.31 |
| 8,581,457 B2 * | 11/2013 | Takahashi et al. | 310/67 R |
| 8,733,483 B2 * | 5/2014 | Yamamoto et al. | 180/65.51 |
| 8,734,283 B2 * | 5/2014 | Takuno et al. | 475/177 |
| 2005/0045393 A1 * | 3/2005 | Mizutani et al. | 180/65.5 |
| 2005/0061565 A1 * | 3/2005 | Mizutani et al. | 180/65.5 |
| 2006/0027417 A1 * | 2/2006 | Segawa | 180/444 |
| 2007/0181357 A1 * | 8/2007 | Saito et al. | 180/65.5 |
| 2007/0246277 A1 * | 10/2007 | Mizutani et al. | 180/65.5 |
| 2008/0035399 A1 * | 2/2008 | Murata et al. | 180/65.5 |
| 2008/0169141 A1 * | 7/2008 | Suzuki | 180/65.7 |
| 2008/0217097 A1 * | 9/2008 | Segawa | 180/444 |
| 2008/0308330 A1 * | 12/2008 | Murata | 180/65.5 |
| 2009/0025991 A1 * | 1/2009 | Moriguchi et al. | 180/65.5 |
| 2009/0166112 A1 | 7/2009 | Yoshino et al. | |
| 2009/0236157 A1 * | 9/2009 | Akamatsu | 180/55 |
| 2009/0236158 A1 * | 9/2009 | Sakuma et al. | 180/65.51 |
| 2011/0011203 A1 * | 1/2011 | Yamamoto et al. | 74/606 A |
| 2011/0133541 A1 * | 6/2011 | Makino et al. | 301/6.5 |
| 2012/0181848 A1 * | 7/2012 | Makino et al. | 301/6.5 |
| 2012/0229004 A1 * | 9/2012 | Takahashi et al. | 310/67 R |
| 2012/0235462 A1 * | 9/2012 | Yamamoto et al. | 301/6.5 |
| 2012/0330490 A1 * | 12/2012 | Ozaki et al. | 701/22 |
| 2013/0009450 A1 * | 1/2013 | Suzuki et al. | 301/6.5 |
| 2013/0057117 A1 * | 3/2013 | Suzuki et al. | 310/60 R |
| 2013/0119748 A1 * | 5/2013 | Yamamoto | 301/6.5 |
| 2013/0292993 A1 * | 11/2013 | Yukishima et al. | 301/6.5 |

FOREIGN PATENT DOCUMENTS

| | | |
|---|---|---|
| JP | 2007-269129 | 10/2007 |
| JP | 2008-195233 | 8/2008 |
| JP | 2009-52630 | 3/2009 |
| JP | 2009-257472 | 11/2009 |
| JP | 2010-48279 | 3/2010 |
| JP | 2010-71462 | 4/2010 |

OTHER PUBLICATIONS

International Preliminary Report on Patentability issued Feb. 21, 2013 in International (PCT) Application No. PCT/JP2011/066332.

* cited by examiner

IN-WHEEL MOTOR DRIVE DEVICE

TECHNICAL FIELD

The present invention relates to an in-wheel motor driving device which connects an output shaft of an electric motor with a wheel hub via a speed reducer.

BACKGROUND ART

JP-A-2009-52630 (Patent Literature 1), for example, discloses a conventional in-wheel motor driving device 101.

As shown in FIG. 15, the in-wheel motor driving device 101 includes a casing 102 which is attached to a vehicle body; a motor section 103 which is placed therein and generates a driving force; a wheel hub bearing section 104 which is connected to a wheel; and a speed reducer section 105 which reduces rotation of the motor section 103 and transmits the rotation to the wheel hub bearing section 104.

In the in-wheel motor driving device 101 of the above-described construction, a low-torque high-rotation motor is utilized for the motor section 103 in view of reducing the size of the device. On the other hand, the wheel hub bearing section 104 requires a large torque in order to drive the wheel. For these reasons, a cycloid reduction gear system is often utilized for the speed reducer section 105 due to its compactness and high speed-reduction ratio.

The speed reducer section 105 utilizing a cycloid reduction gear system includes a motor-side rotation member 106 which has eccentric sections 106a, 106b; cycloid discs 107a, 107b which are disposed in the eccentric sections 106a, 106b; roller bearings 106c which rotatably support the cycloid discs 107a, 107b with respect to the motor-side rotation member 106; a plurality of outer pins 108 which make engagement with outer circumferential surfaces of the cycloid discs 107a, 107b to generate rotational movement of the cycloid discs 107a, 107b; and a plurality of inner pins 109 which transmit the rotational movement of the cycloid discs 107a, 107b to a wheel-side rotation member 110.

The outer pins 108 are not held directly by a casing 102a of the speed reducer section 105, but by an outer pin housing 113 which is provided on an inner diameter surface of the casing 102a. More specifically, two axial end portions of each outer pin are supported rotatably by needle bearings 114 which are fixed to the outer pin housing 113. By making the outer pins 108 rotatable with respect to the outer pin housing 113 in this way, contact resistance caused by engagement with the cycloid discs 107a, 107b is reduced.

CITATION LIST

Patent Literature

Patent Literature 1: JP-A-2009-52630

SUMMARY OF INVENTION

Technical Problem

As shown in an enlarged view in FIG. 16, the outer pin housing 113 has a cylindrical section 113a and a pair of flange portions 113b, 113b extending radially inward from axial ends of the cylindrical section 113a. With the above, the outer pin housing 113 is fitted and fixed onto the inner diameter surface of the casing 102a via elastic members 115. The elastic members 115 allow redial and axial displacement of the outer pin housing 113. This protects the cycloid discs 107a, 107b, the outer pins 108, the inner pins 109 and other components from damage which would be caused by a large radial load or moment load at a time of sharp turning, sudden acceleration/deceleration, etc. of the electric vehicle. Also, the arrangement eliminates rattling noise caused by contact between the casing 102a and the outer pin housing 113 due to vibration when driving rough terrains for example.

However, although the outer pin housing 113 is floating radially with respect to the casing 102a due to the elastic members 115 provided therearound, it is locked by a key, for example, in its rotating directions, which will allow the outer pin housing 113 to conduct torque and/or vibration acting thereon to the casing 102a, resulting in noise generation.

It is therefore an object of the present invention to provide a quiet in-wheel motor driving device by reducing vibration which can be generated between the casing of the speed reducer section and the housing of the speed reducer housed inside the casing of the speed reducer section.

Solution to Problem

In order to achieve the above-stated object, the present invention provides an in-wheel motor driving device which includes a casing encasing therein: a motor section for generation of a driving force; and a speed reducer section for reducing speed of rotation generated by the motor section and then transmitting the rotation to a wheel hub bearing section connected to a wheel. In addition, the device further includes a casing immobilizing member fixed to an inner surface of the casing, and a housing immobilizing member fixed to an outer surface of a speed reducer section housing, between the casing and the speed reducer section housing. The casing immobilizing member and the housing immobilizing member are immobilized from rotation, via an elastic member.

The elastic member may be made of rubber. The rubber is bonded to the casing immobilizing member and to the housing immobilizing member as well, using an adhesive or by vulcanization.

The casing immobilizing member may be implemented by a large-diameter cylindrical section in an inner surface of the casing and a flange formed on an end surface of the large-diameter cylindrical section. The flange of the casing immobilizing member has a bolt hole for fixation to the casing.

Also, the housing immobilizing member may be implemented by a small-diameter cylindrical section in an outer surface of the speed reducer section housing and a flange formed on an end surface of the small-diameter cylindrical section. The flange of this housing immobilizing member has a bolt hole for fixation to the speed reducer section housing.

With the above arrangement, the large-diameter cylindrical section and the small-diameter cylindrical section are bonded to each other by vulcanization of the rubber which provides the elastic member.

Due to this arrangement, torque acting on the housing of the speed reducer section is transmitted from the small-diameter cylindrical section which is fixed to the housing of the speed reducer section, to the large-diameter cylindrical section via the rubber which is bonded thereto by vulcanization.

It is preferable that the bolt used for fixation to the flange of the housing immobilizing member is provided by a hex-key bolt rather than a hex bolt.

It is preferable that the flange of the casing immobilizing member has a through-hole or a cutout formed correspondingly to the hex-key bolt so that the head of the hex-key bolt can make contact with an inner surface of this through-hole or cutout.

As the head of the hex-key bolt makes contact with the inner surface of the through-hole or cutout, the hex-key bolt serves as a stopper in directions of rotation.

The rubber is subjected to a load applied repeatedly from the housing of the speed reducer section, and sometimes the load applied is an impact load. The rubber would rupture at an early time if it deforms excessively under such a loading condition, so it is preferable to allow the head of the hex-key bolt to make contact with the inner surface of the through-hole or cutout, making the bolt serving as a stopper in directions of rotation.

The stopper in the directions of rotation may be provided by another arrangement: Specifically, the large-diameter cylindrical section in the inner surface of the casing has its inner diameter side formed with a plurality of projections whereas the small-diameter cylindrical section has its outer diameter side formed with an identical number of projections with those on the large-diameter cylindrical section, being spaced therefrom.

The above-described arrangements provide stoppers in both of the rotating directions, making the rubber less prone to twisting deformation and more durable.

As another means provided by the present invention, there is an arrangement where the casing axially faces a housing of the speed reducer section, sandwiching therebetween a ring plate bolted to the casing and a ring plate bolted to the housing of the speed reducer section, and these two ring plates are bonded to each other by vulcanization of rubber.

According to this arrangement, the size in radial direction can be reduced, which provides an advantage of weight reduction.

It is preferable that the bolt for fixing the ring plate to the housing of the speed reducer section is provided by a hex-key bolt.

It is preferable that the ring plate bolted to the housing of the speed reducer section has a hole corresponding to the hex-key bolt so as to allow the hex-key bolt and the hole to make contact with each other upon application of an excessive torque.

Forming the hole as a long hole extending in the directions of rotation makes it possible to maintain the radial thickness of the ring plate.

Also, as still another arrangement, the two rubber-vulcanized ring plates are sandwiched between the housing of the speed reducer section and the casing of the motor section, with one of the two ring plates being fixed to the housing of the speed reducer section while the other being fixed to the casing of the motor section. The arrangement, which provides the ring plates on both of the axial sides of the housing of the speed reducer section, improves load capacity.

It is preferable that the ring plate is made of a light-weight metal such as aluminum, with a steel threaded-piece added thereto in insert molding for the sake of weight reduction. The steel threaded-piece may be used as an individual piece added in the insert molding process, but more preferably, the piece is welded to a thin ring plate and then subjected to insert molding.

Preferably, the rubber utilized in the present invention is oil-resistant rubber such as nitrile rubber, hydrogenated nitrile rubber, acrylic rubber and fluoro-rubber.

The speed reducer section may be whichever of cycloid reduction gear system and planetary gear system.

Where the speed reducer section is provided by a cycloid reduction gear system, the housing of the speed reducer section is provided by an outer pin housing of the cycloid reduction gear system.

On the other hand, where the speed reducer section is provided by a planetary gear system, the housing of the speed reducer section is provided by an inner gear of the planetary gear system.

Advantageous Effects of Invention

As has been described, the present invention includes a casing immobilizing member which is fixed to an inner surface of the speed reducer section casing and a housing immobilizing member which is fixed to an outer surface of the speed reducer section housing, between the speed reducer section casing and the housing which receives rotating torque of the speed reducer, and the casing immobilizing member and the housing immobilizing member are prevented from rotation, via an elastic member such as rubber. Hence, the speed reducer housing is held in a predetermined place by the elastic member, and even when the speed reducer housing comes under a large load or moment load which could be caused by turning, sudden acceleration/deceleration, etc., the invention is capable of preventing such components as in the motion conversion mechanism, from being damaged by such a load.

Also, the invention eliminates rattling noise caused by vibration when driving on, e.g., a rough terrain.

DESCRIPTION OF EMBODIMENTS

Hereinafter, embodiments of the present invention will be described based on the attached drawings.

Figure 13:
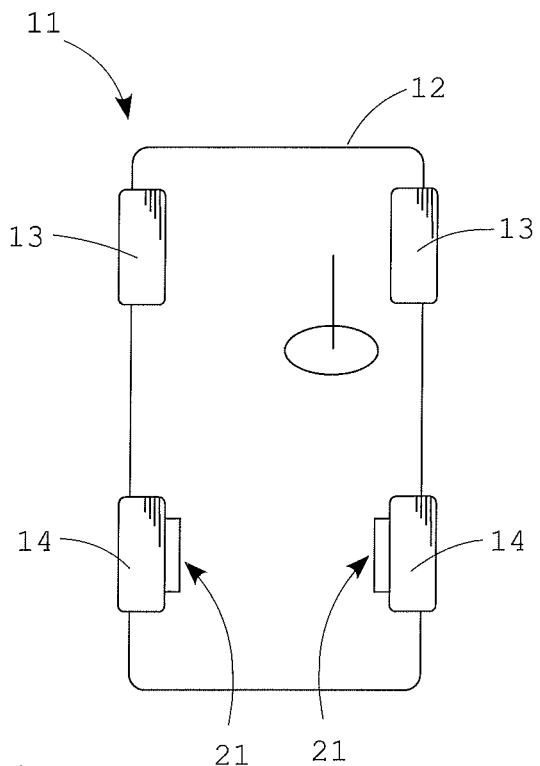
FIG. 13 is a schematic plan view of an electric vehicle which includes in-wheel motor driving devices.
Figure 14:
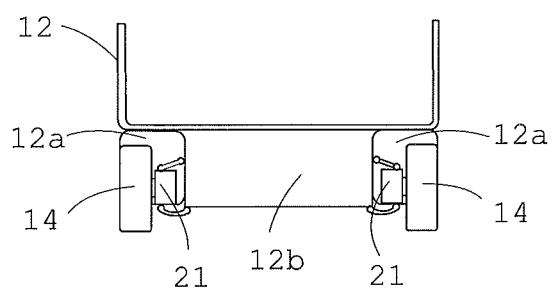
FIG. 14 is a rear view of the electric vehicle in FIG. 13.
Figure 15:
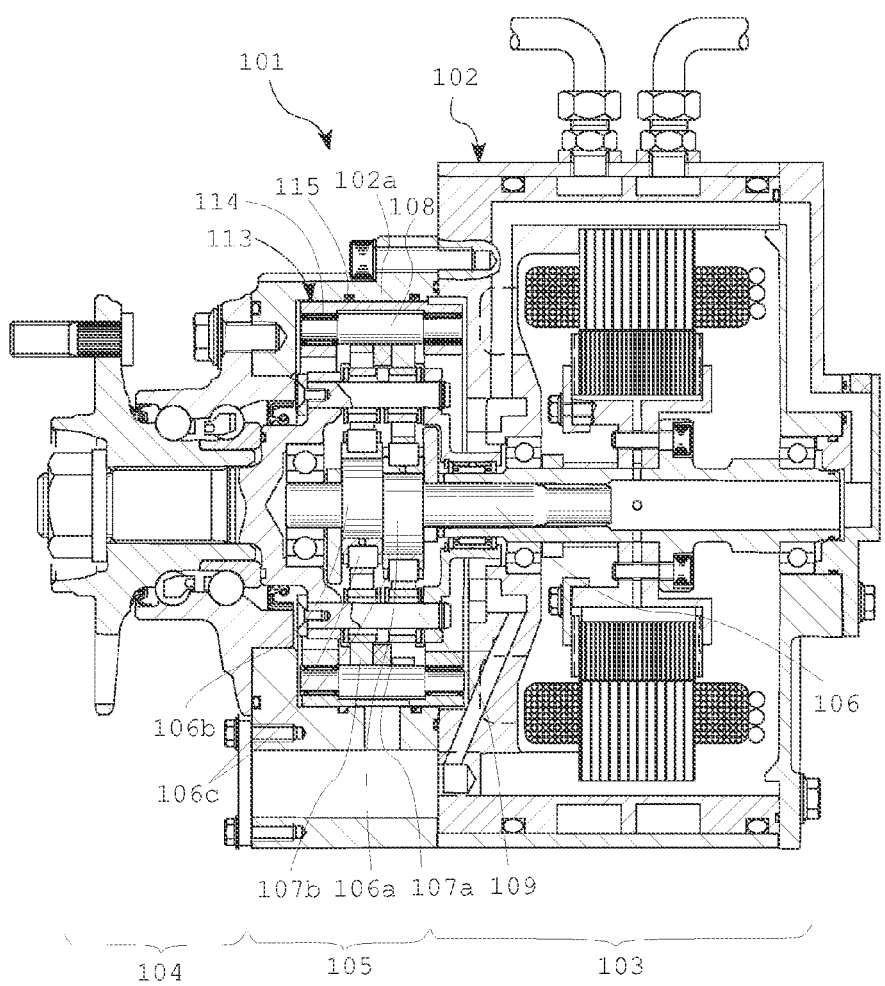
FIG. 15 is a schematic sectional view of a conventional in-wheel motor driving device.
Figure 16:
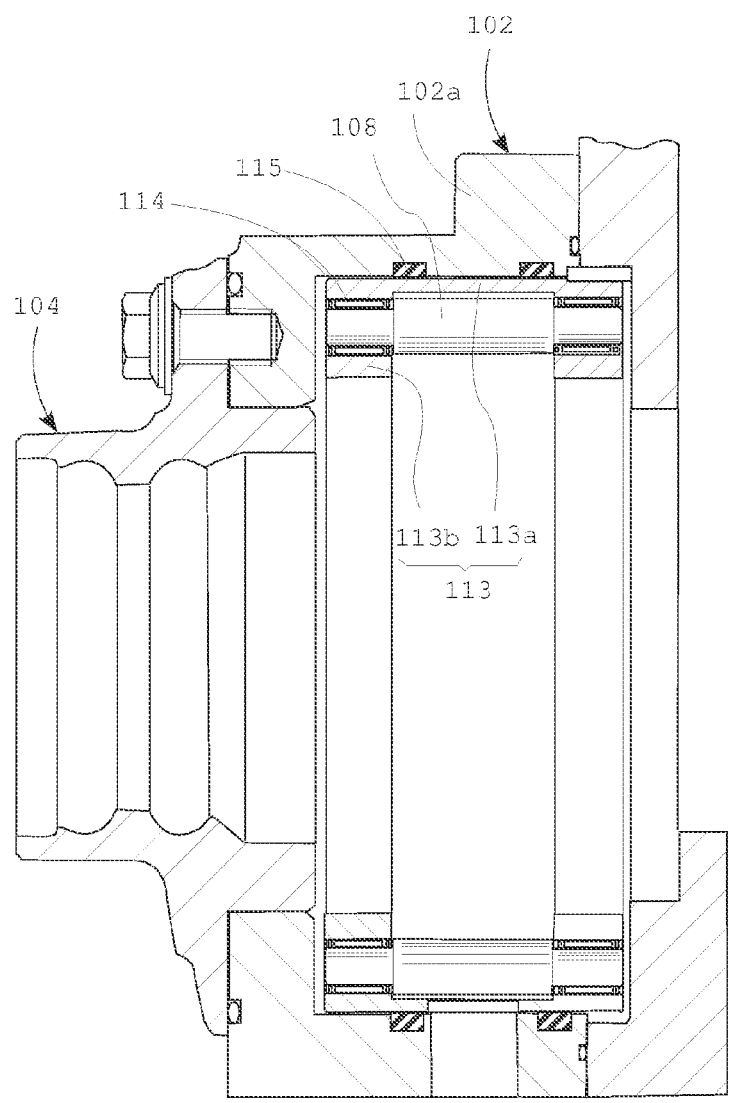
FIG. 16 is an enlarged view, showing a state where a casing of a speed reducer section and a housing of a speed reducer in FIG. 15 are fixed to each other.

As shown in FIG. 13, an electric vehicle 11 equipped with in-wheel motor driving devices according to an embodiment of the present invention includes a chassis 12, front wheels 13 as steering wheels, rear wheels 14 as driving wheels, and in-wheel motor driving devices 21 which transmit driving forces to the left and the right rear wheels 14 respectively. As shown in FIG. 14, the rear wheels 14 are housed inside wheel housings 12a of the chassis 12, and are fixed to a lower portion of the chassis 12 via suspension systems (suspension) 12b.

The suspension system 12b includes suspension arms extending in the left-right direction and supporting the rear wheels 14, and struts each having a coil spring section and a shock absorber, thereby absorbing vibrations coming through the rear wheels 14 from the ground and reducing vibration of the chassis 12. Further, a stabilizer which reduces tilting of the vehicle body during a turning operation for example, is provided at a connection of the left and right suspension arms. Preferably, the suspension system 12b should be designed as an independent suspension system which is capable of allowing the left and the right wheels to move in vertical direction independently from each other for improved ground following and efficient transmission of driving force to the road surface even if the road surface has some irregularities.

In the electric vehicle 11, each of the in-wheel motor driving devices 21 is housed individually inside the corresponding wheel housing 12a and drives one of the left and the right rear wheels 14 and therefore there is not need for providing a motor, a drive shaft, a deferential gear mechanism, etc. on the chassis 12. This provides an advantage that a wide space can be used for the driver and passengers and rotation of the left and the right drive wheels can be controlled independently from each other.

It is necessary, however, to reduce the unsprung weight in order for the electric vehicle 11 to have improved driving stability. Also, in order to provide more driver/passenger space, there is a requirement for size/weight reduction in the in-wheel motor driving devices 21.

FIG. 1 through FIG. 5 show an in-wheel motor driving device 21 according to an embodiment of the present invention.

Figure 1:
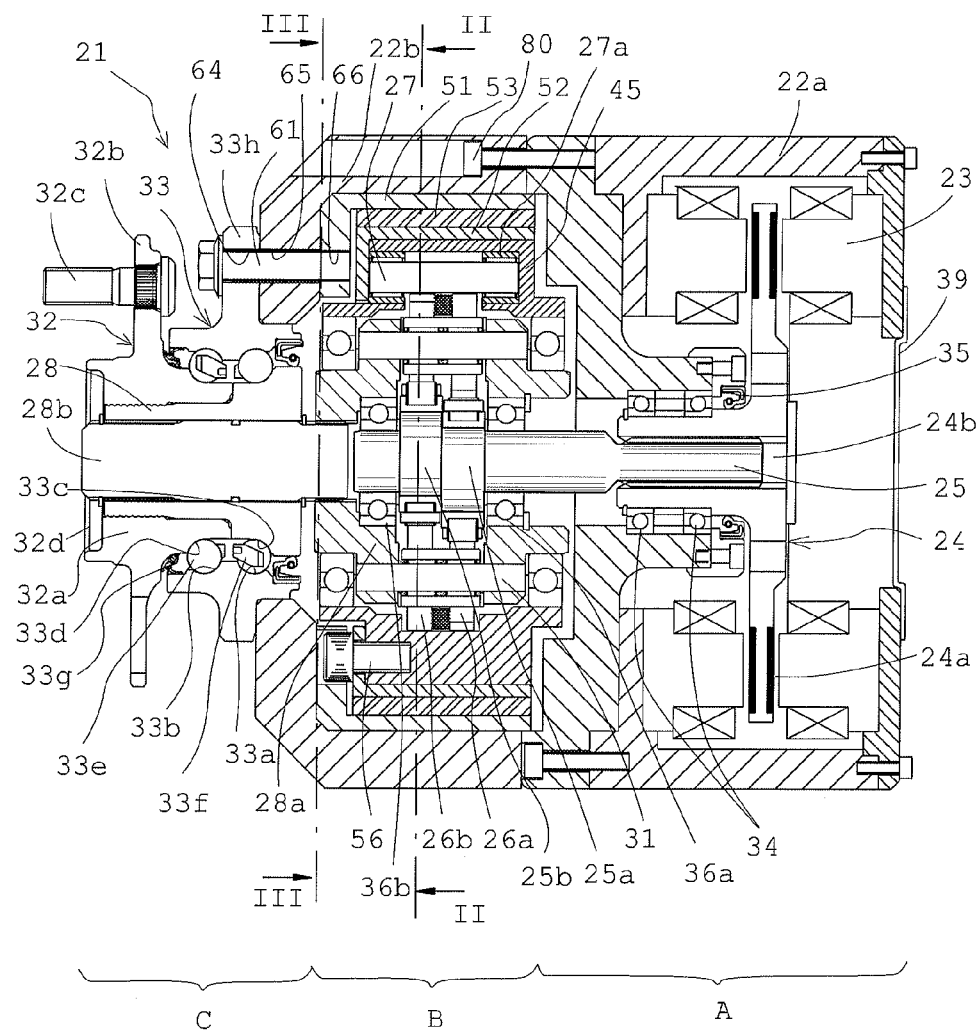
FIG. 1 is a schematic sectional view of an in-wheel motor driving device according to a first embodiment of the present invention.

As shown in FIG. 1, the in-wheel motor driving device 21 includes a motor section A which generates a driving force; a speed reducer section B which reduces rotating speed of the motor section A and outputs the rotating force; and a wheel hub bearing section C which transmits the output from the speed reducer section B to the driving wheel 14. The motor section A and the speed reducer section B are housed in a motor section casing 22a and a speed reducer section casing 22b, and the device is installed inside the wheel housing 12a of the electric vehicle 11 as shown in FIG. 13. The motor section casing 22a and the speed reducer section casing 22b are integrated with each other by bolts 80.

The motor section A is provided by an axial-gap motor which includes a stator 23 fixed to the motor section casing 22a; a rotor 24 opposed thereto and disposed inside the stator 23 with an axial gap in between; and a motor-side rotation member 25 disposed inside the rotor 24 and fixed thereto for integral rotation with the rotor 24. Also, the motor section A has an end surface facing away from the speed reducer section B, which is provided with a sealing member 39 in order to prevent dirt, dust, etc. from making entry into the motor section A.

The rotor 24 includes a flange-shaped rotor section 24a and a cylindrical hollow section 24b, and is supported by roller bearings 34 rotatably with respect to the motor section casing 22a. Also, a sealing member 35 is provided between the motor section casing 22a and the rotor 24 in order to prevent lubricant, which is packed in the speed reducer section B, from making entry into the motor section A.

The motor-side rotation member 25, which transmits the driving force from the motor section A to the speed reducer section B, is disposed across the motor section A and the speed reducer section B, and includes eccentric sections 25a, 25b inside the speed reducer section B. The motor-side rotation member 25 has one end fitted into the rotor 24, and is supported by roller bearings 36a, 36b at two ends of the speed reducer section B. Further, the two eccentric sections 25a, 25b are disposed at a 180-degree phase difference so that vibrations caused by centrifugal forces from eccentric movement are cancelled each other.

The speed reducer section B includes cycloid discs 26a, 26b which serve as revolving members and are rotatably held by the eccentric sections 25a, 25b; a plurality of outer pins 27 which serve as outer circumferential engager for engagement with outer circumferential portions of the cycloid discs 26a, 26b; and a motion conversion mechanism which transmits rotational movement of the cycloid discs 26a, 26b to a wheel-side rotation member 28.

The wheel-side rotation member 28 includes a flange section 28a and a shaft section 28b. The flange section 28a has its end surface formed with holes equidistantly on a circle centered around a rotational center of the wheel-side rotation member 28, for fixing inner pins 31. The shaft section 28b has its outer diameter surface formed with a first inner track surface 33c for a wheel hub bearing 33.

Figure 2:
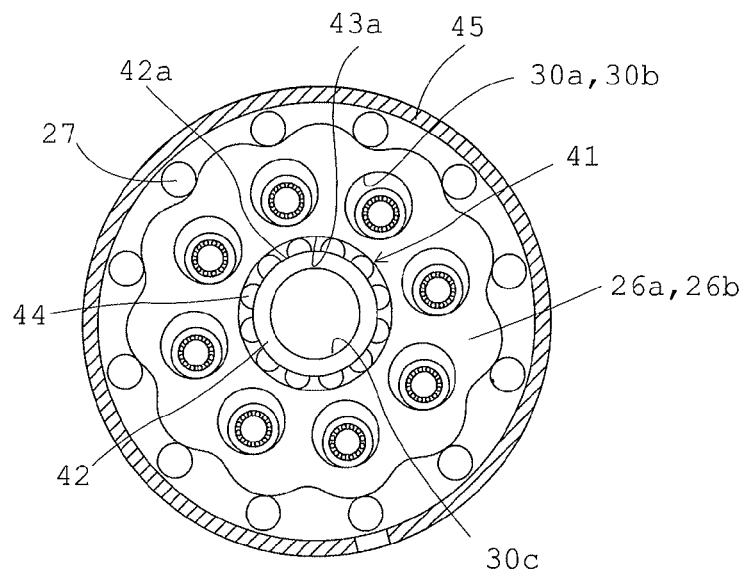
FIG. 2 is a sectional view taken in line II-II in FIG. 1.

As shown in FIG. 2, the cycloid discs 26a, 26b have a plurality of waveforms composed of trochoid curves such as epitrochoid curve, on their outer circumferences, and a plurality of through-holes 30a, 30b penetrating from one end surface to the other end surface. The through-holes 30a, 30b are made equidistantly on a circle centering on the rotational center of the cycloid discs 26a, 26b, and accommodate the inner pins 31 which will be described later. Also, a through-hole 30c penetrates the center of the cycloid discs 26a, 26b, and fits around the eccentric sections 25a, 25b.

The cycloid disc 26a is supported by a roller bearing 41 rotatably with respect to the eccentric section 25a. The roller bearing 41 is provided by a cylindrical roller bearing which includes an inner ring member 42 fitted around an outer diameter surface of the eccentric section 25a and having an inner track surface 42a on its outer diameter surface; an outer track surface 43a formed on an inner diameter surface of the through-hole 30c of the cycloid disc 26a; a plurality of cylindrical rollers 44 disposed between the inner track surface 42a and the outer track surface 43a; and a retainer (not illustrated) which keeps the distance between the cylindrical rollers 44.

The outer pins 27 are disposed equidistantly on a circular track which centers around the rotational center of the motor-side rotation member 25. As the cycloid discs 26a, 26b make their revolutions, the wavy curves and the outer pins 27 engage with each other and generate rotational movement of the cycloid discs 26a, 26b.

The outer pins 27 are not held directly by the speed reducer section casing 22b, but by an outer pin housing 45 which constitutes a housing for the speed reducer that is fixed to an inner diameter surface of the speed reducer section casing 22b. More specifically, a casing immobilizing member 51 which is fixed to an inner surface of the speed reducer section casing 22b and a housing immobilizing member 52 which is fixed to an outer surface of the outer pin housing 45 are provided between the speed reducer section casing 22b and the outer pin housing 45 which constitutes the speed reducer housing, with a rubber member 53 sandwiched by the two immobilizing members to prevent these members from rotating.

It should be noted here that two axial ends of the outer pin 27 are rotatably supported by needle bearings 27a which are fixed onto the outer pin housing 45. By making the outer pins 27 rotatable with respect to the outer pin housing 45 in this way, contact resistance caused by engagement with the cycloid discs 26a, 26b is reduced.

The rubber member 53 is bonded to the casing immobilizing member 51 and to the housing immobilizing member 52 as well, using an adhesive or by vulcanization.

Figure 4A:
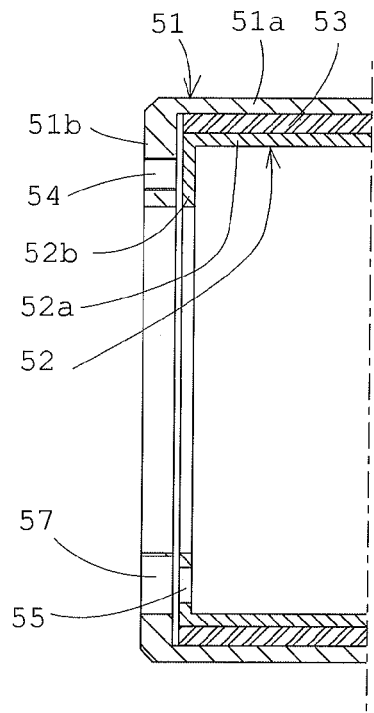
FIG. 4A is a vertical sectional view, showing the casing immobilizing member and the housing immobilizing member taken in the line II-II in FIG. 1.
Figure 4B:
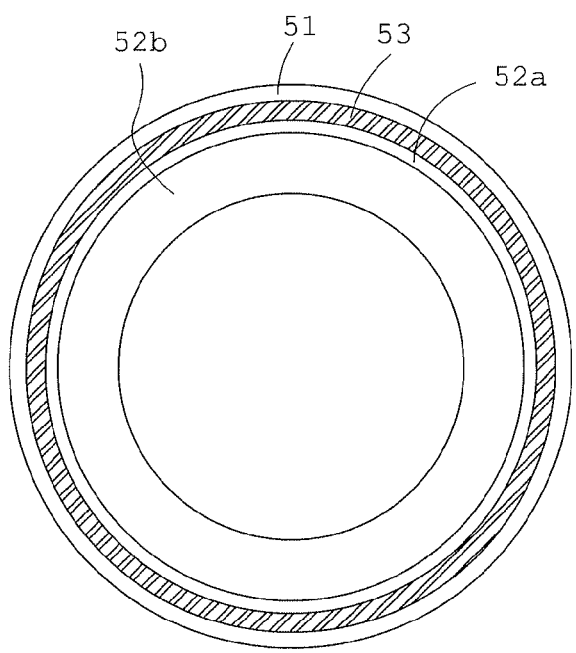
FIG. 4B is a right end view of the members shown in FIG. 4A.

As shown in FIG. 4, the casing immobilizing member 51 can be constituted by a large-diameter cylindrical section 51a placed on an inner surface of the speed reducer section casing 22b; and a flange 51b which is formed on an end surface of the large-diameter cylindrical section 51a. The flange 51b of the casing immobilizing member 51 has bolt holes 54 for fixation to the casing 22b.

Also, the housing immobilizing member 52 can be constituted by a small-diameter cylindrical section 52a placed on an outer surface of the outer pin housing 45; and a flange 52b which is formed on an end surface of the small-diameter cylindrical section 52a. The flange 52b of the housing immobilizing member 52 has bolt holes 55 for fixation to the outer pin housing 45.

Then, the large-diameter cylindrical section 51a and the small-diameter cylindrical section 52a are bonded to each other by vulcanization of the rubber member 53 which serves as the elastic member.

Due to this arrangement, torque acting on the outer pin housing 45 is transmitted from the small-diameter cylindrical section 52a, which is fixed to the outer pin housing 45, to the large-diameter cylindrical section 51a via the rubber member 53 which is bonded thereto by vulcanization.

Bolts 56 for the fixation to the flange 52b of the housing immobilizing member 52 are not provided by hexagonal bolts but by hex-key bolts which have a hexagonal key hole in their heads.

Figure 3:
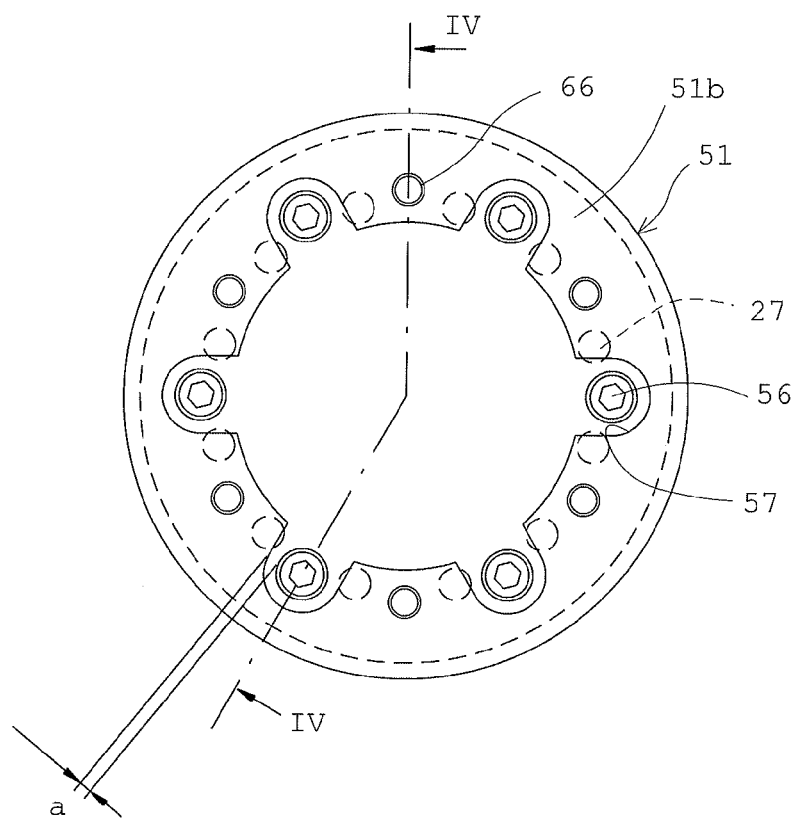
FIG. 3 is a side view of a casing immobilizing member taken in line III-III in FIG. 1.

The flange 51b of the casing immobilizing member 51 has cutouts 57 formed at locations corresponding to the bolts 56 which are used to fix the housing immobilizing member 52 to the outer pin housing 45. As shown in FIG. 3, a gap "a" is provided between the cutout 57 and the bolt 56. When the outer pin housing 45 comes under a load applied in a rotating direction, the head of the bolt 56 comes in contact with an inner surface of the cutout 57 to serve as a stopper in the rotating direction.

The cutouts 57 may be provided by through-holes.

The rubber member 53 is subjected to a load which is applied repeatedly from the outer pin housing 45 and sometimes the load applied is an impact load. The rubber member 53 would rupture at an early time if it deforms excessively under such a loading condition, so the head of the bolt 56 is designed to make contact with the inner surface of the cutout 57 or of the through-hole as described earlier, to serve as a stopper in the directions of rotation.

Figure 5A:
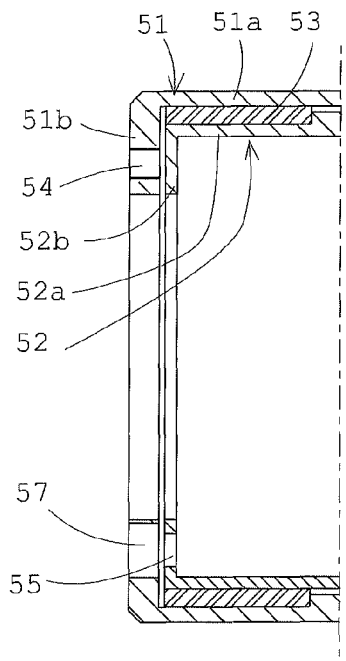
FIG. 5A is a vertical sectional view of a casing immobilizing member and a housing immobilizing member in another embodiment, taken in the line II-II in FIG. 1.
Figure 5B:
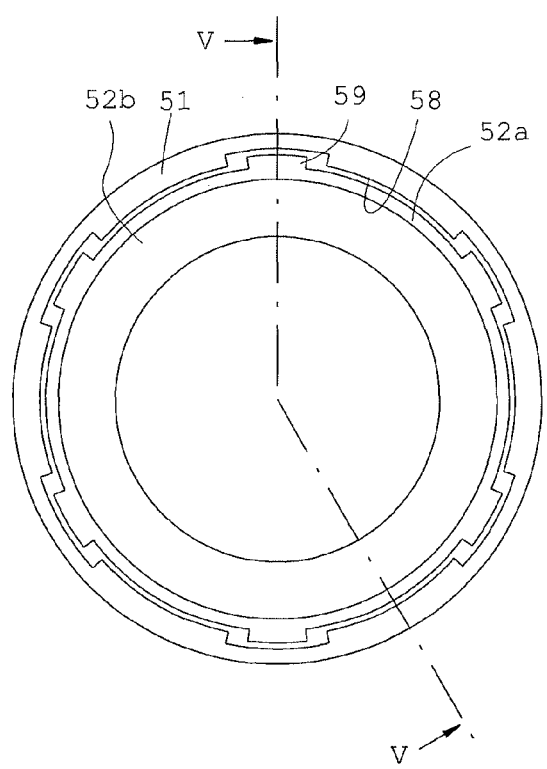
FIG. 5B is a right end view of the members shown in FIG. 5A.
Figure 6:
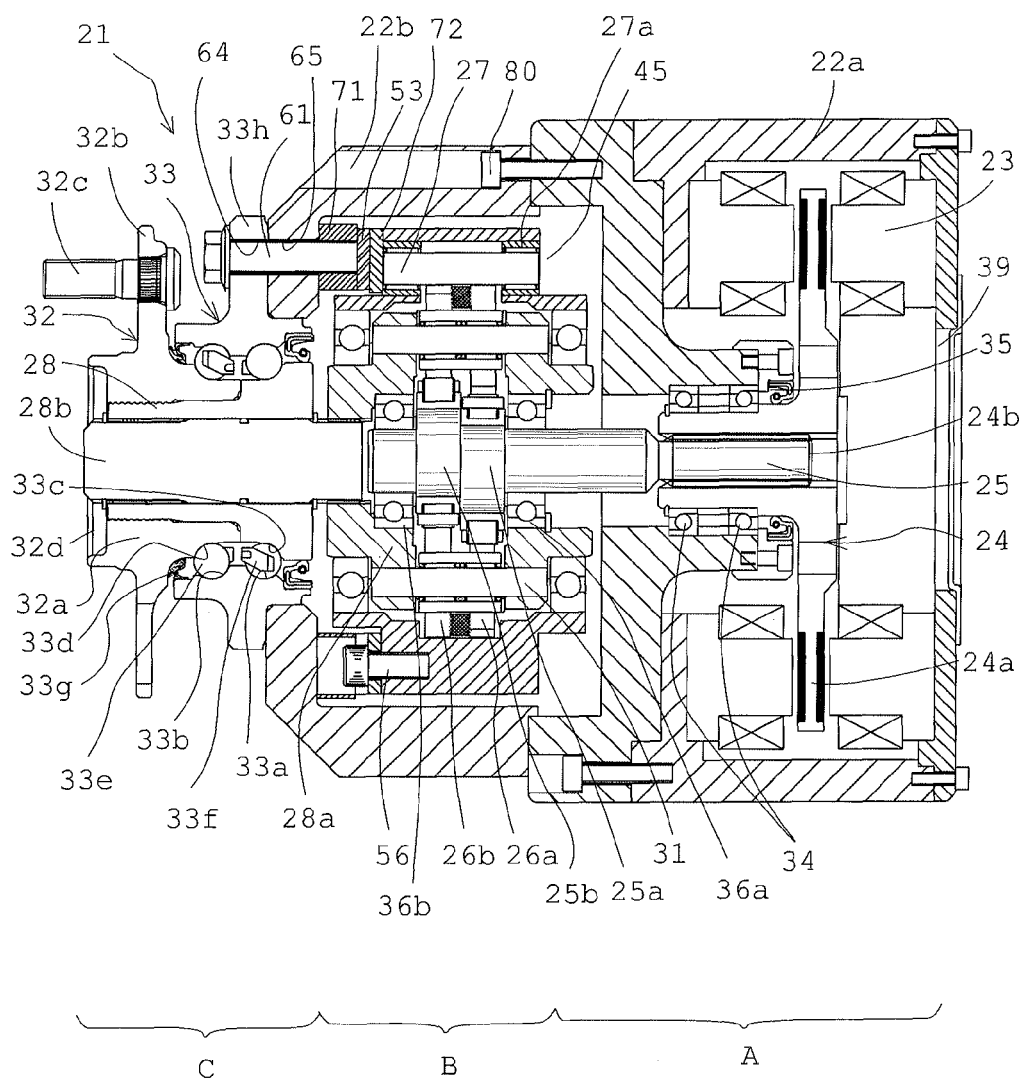
FIG. 6 is a schematic sectional view of an in-wheel motor driving device according to a second embodiment of the present invention.

The stopper in directions of rotation may be provided by another arrangement as shown in FIG. 5. Specifically, a plurality of projections 58 are formed in an inner diameter side of the large-diameter cylindrical section 51a which is positioned on an inner surface of the casing 22b whereas projections 59 are formed in the same number on an outer diameter side of the small-diameter cylindrical section 52b, being spaced from the projections 58 of the large-diameter cylindrical section 51a.

The above-described arrangement provides stoppers in both directions of rotation, making the rubber member 53 less prone to twisting deformation and more durable.

The wheel hub bearing section C includes a wheel hub 32 connected and fixed to the wheel-side rotation member 28, and the wheel hub bearing 33 which supports the wheel hub 32 rotatably with respect to the speed reducer section casing 22b. The wheel hub 32 has a cylindrical hollow portion 32a and a flange portion 32b. The driving wheel 14 is fixed to the flange portion 32b with bolts 32c. Also, the hollow section 32a has a sealing member 32d at its opening in order to prevent dirt and dust from making entry into the in-wheel motor driving device 21.

The wheel hub bearing 33 is provided by a double row angular contact ball bearing which makes use of balls 33e serving as rolling elements. Track surfaces for the balls 33e are a first outer track surface 33a (one in right hand side in the figure) and a second outer track surface 33b (one in left hand side in the figure) formed in an inner diameter surface of an outer member 33h; the first inner track surface 33c formed in an outer diameter surface of the wheel-side rotation member 28 to oppose to the first outer track surface 33a; and a second inner track surface 33d formed in an outer diameter surface of the wheel hub 32 to oppose to the second outer track surface 33b. With the arrangement described above, a plurality of the balls 33e are disposed between the first outer track surface 33a and the first inner track surface 33c, as well as between the second outer track surface 33b and the second inner track surface 33d. Also, the wheel hub bearing 33 includes a retainer 33f which holds the balls 33e in both of the left and the right rows, and a sealing member 33g which prevents grease or other lubricant packed inside the bearing from leaking while preventing dirt and dust from making entry from outside.

The wheel hub bearing 33 has the outer member 33h, which is fixed to the speed reducer section casing 22b with fastening bolts 61.

The outer member 33h of the wheel hub bearing 33 has a flange portion formed with a plurality of bolt insertion holes 64 in its circumferential direction for fastening bolts 61.

Also, the casing 22b of the speed reducer section B has bolt insertion holes 65 for the fastening bolts 61 which are inserted through the bolt insertion holes 64 in the flange portion of the outer member 33h.

Also, the flange 51b of the casing immobilizing member 51 has bolt holes 66 for the fastening bolts 61.

The fastening bolts 61 are inserted from the side on the wheel hub bearing 33 through the bolt insertion holes 64 in the flange section of the outer member 33h. The fastening bolts 61 have their tips threaded into the bolt holes 65 in the speed reducer section casing 22b, then threaded into the bold holes 66 in the casing immobilizing member 51, whereby the casing immobilizing member 51 is fixed to the speed reducer section casing 22b.

Next, a second embodiment of the present invention will be described with reference to FIG. 6 through FIG. 9, where the outer pin housing 45 is fixed to the speed reducer section casing 22b by different means.

The embodiment uses essentially the same motor section A, speed reducer section B and wheel hub bearing section C as those in the first embodiment, so any parts or components thereof will be identified with the same reference numbers but their detailed description will not be repeated.

In this second embodiment, a ring plate 71 which is fixed to the speed reducer section casing 22b by the bolts 61 and a ring plate 72 which is fixed to the outer pin housing 45 by bolts 56 are sandwiched by the speed reducer section casing 22b and the outer pin housing 45 which constitutes the speed reducer housing, on an axial end surface facing the wheel hub bearing section C, and these two ring plates 71, 72 are bonded to each other by vulcanization of the rubber member 53.

According to the second embodiment, the size in radial direction can be reduced, providing an advantage of weight reduction.

It is preferable that the bolts 56 used to fix the ring plate 72 to the outer pin housing 45 be provided by hex-key bolts, like in the first embodiment.

Figure 7A:
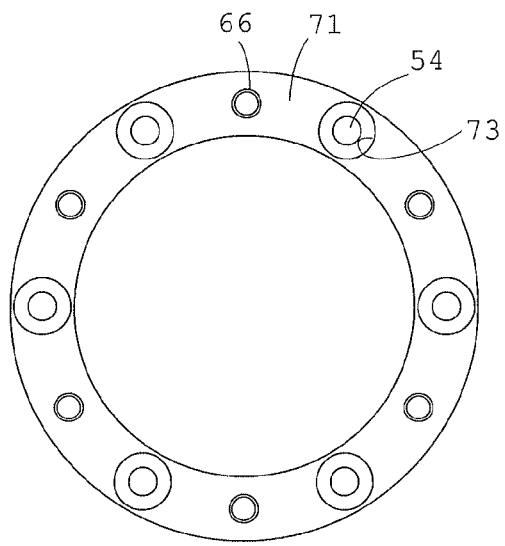
FIG. 7A is a side view from the wheel hub bearing section side, of a casing immobilizing member according to the embodiment in FIG. 6.
Figure 7B:
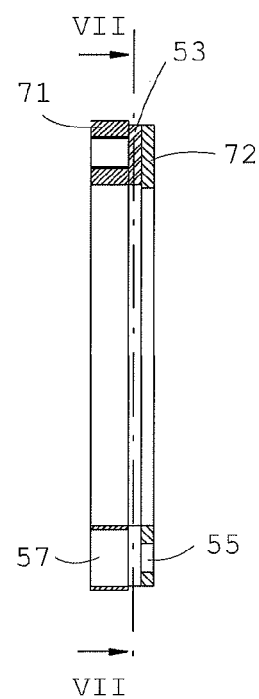
FIG. 7B is a vertical sectional view, showing a state where the casing immobilizing member and the housing immobilizing member in the embodiment in FIG. 6 are bonded together by rubber.
Figure 7C:
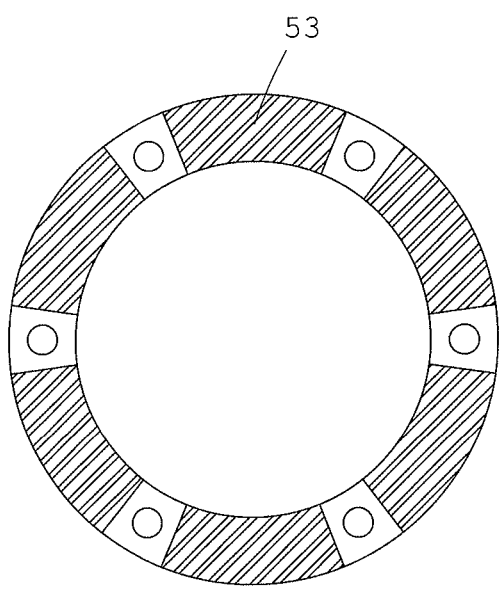
FIG. 7C is a sectional view taken in line VII-VII in FIG. 7B.

As shown in FIG. 7A, the ring plate 71, which is fixed to the speed reducer section casing 22b by the bolts 61, has holes 73 corresponding to the bolts 56.

Figure 8A:
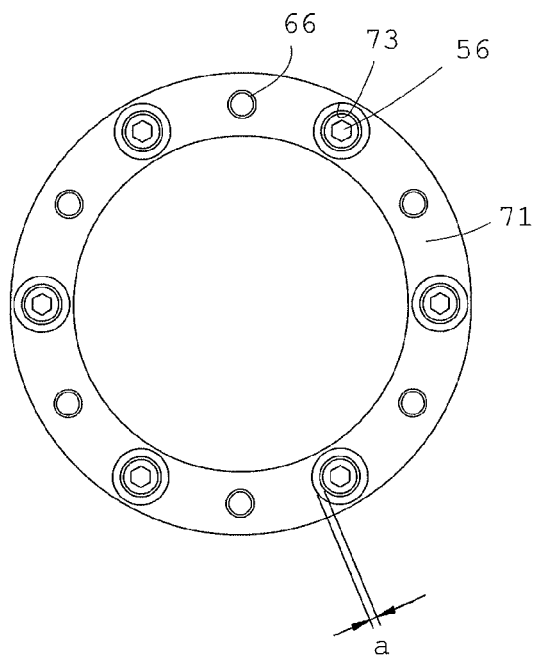
FIG. 8A is a side view from the wheel hub bearing section side, showing a state where bolts are inserted through the casing immobilizing member according to the embodiment in FIG. 6.
Figure 8B:
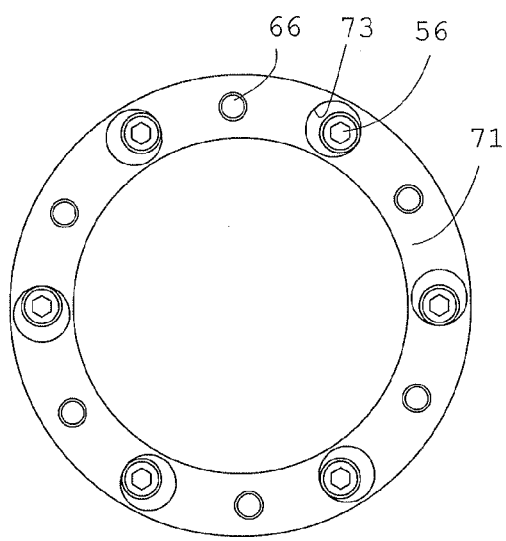
FIG. 8B is a side view, showing a state where a torque is applied in a rotating direction.

As shown in FIG. 8A, the holes 73 are formed to provide a gap "a" between a head of the bolt 56 and an inner surface of the hole 73 when the bolt 56 is inserted. The gap "a" allows the inner surface of the hole 73 and the head of the bolt 56 to make contact with each other as shown in FIG. 8B, to serve as a stopper when there is an excessive torque.

It is preferable that the location of the hole 73 is selected to allow the head of the hex-key bolt 56 to make contact therewith when the torque applied thereto is excessive.

Figure 9A:
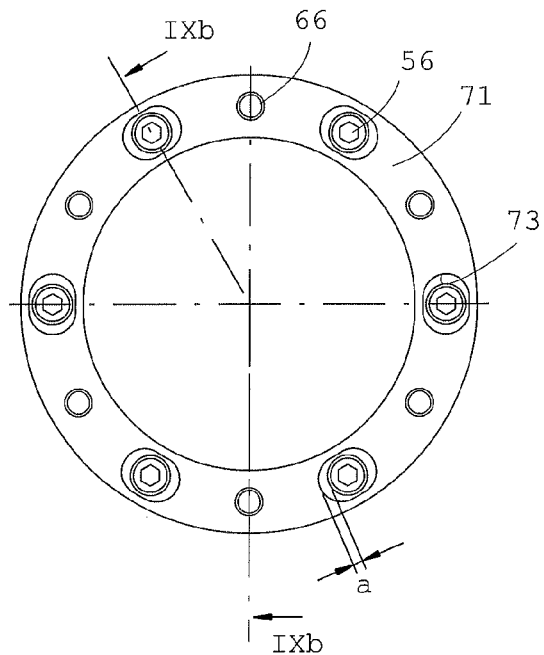
FIG. 9A is a side view from the wheel hub bearing section side, showing a state where bolts are inserted through another casing immobilizing member according to the embodiment in FIG. 6.
Figure 9B:
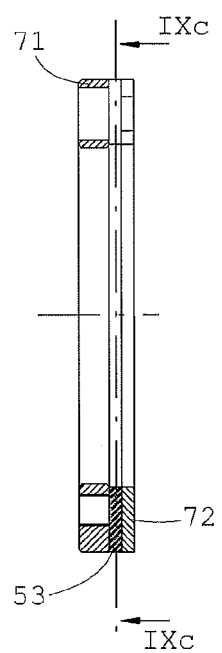
FIG. 9B is a vertical sectional view taken in line IXb-IXb in FIG. 9A, showing a state where the casing immobilizing member and the housing immobilizing member are bonded together by rubber.
Figure 9C:
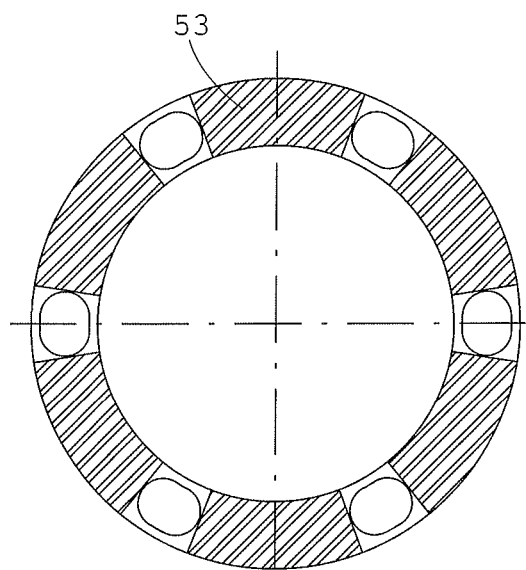
FIG. 9C is a sectional view taken in line IXc-IXc in FIG. 9B.

As shown in FIG. 9, the holes 73 may be long holes elongated in the directions of rotation. This makes it possible to minimize the radial thickness of the ring plate 71.

Figure 10:
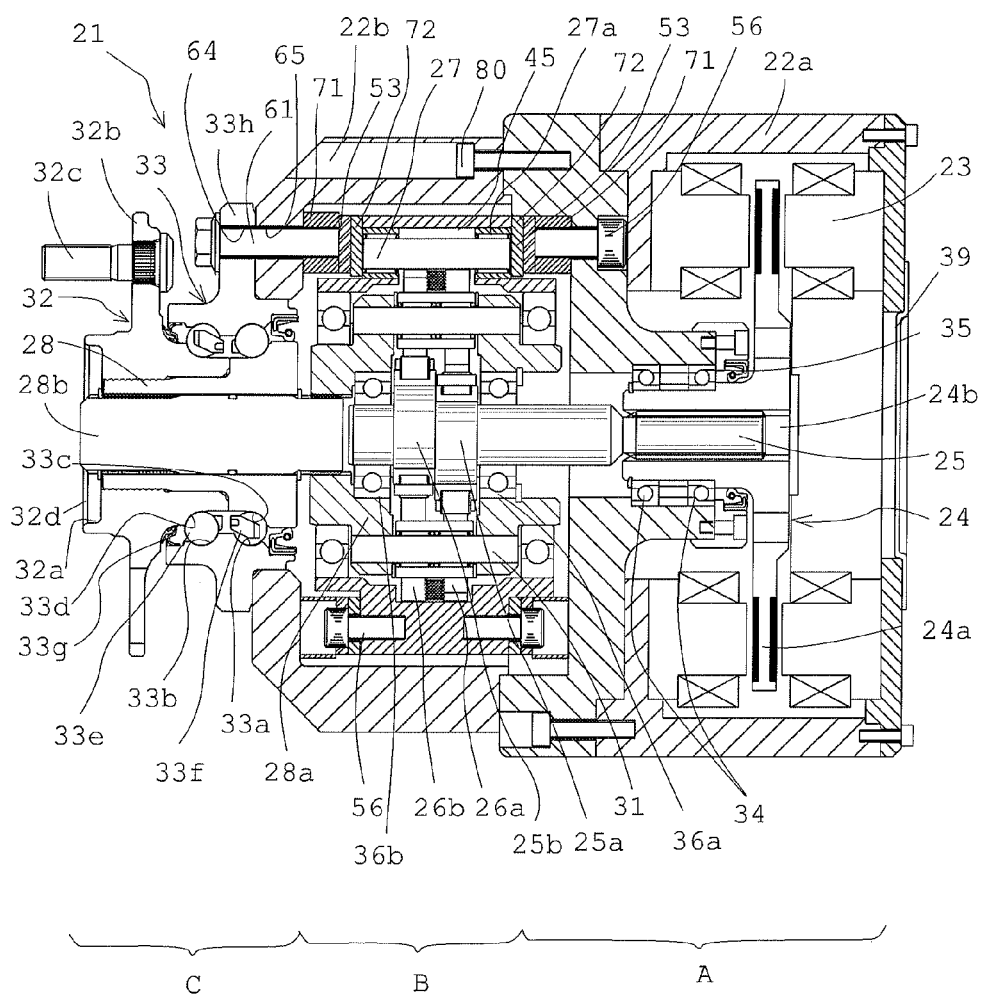
FIG. 10 is a schematic sectional view of an in-wheel motor driving device according to a third embodiment of the present invention.

Next, a third embodiment of the present invention will be described with reference to FIG. 10 through FIG. 12, where the outer pin housing 45 is fixed to the casing 22b of the speed reducer section by different means.

The embodiment uses essentially the same motor section A, speed reducer section B and wheel hub bearing section C as those in the first embodiment, so any parts or components thereof will be identified with the same reference numbers but their detailed description will not be repeated.

This third embodiment includes the ring plate 71 and the ring plate 72 according to the second embodiment not only on the axial wheel hub bearing section C side but also on the motor section A side.

Specifically, the ring plate 71 and the ring plate 72 are provided on both axial sides of the outer pin housing 45 for improved load capacity.

In this embodiment, the ring plate 71 on the motor section A is fixed to the motor section casing 22a by the bolts 56.

Figure 11A:
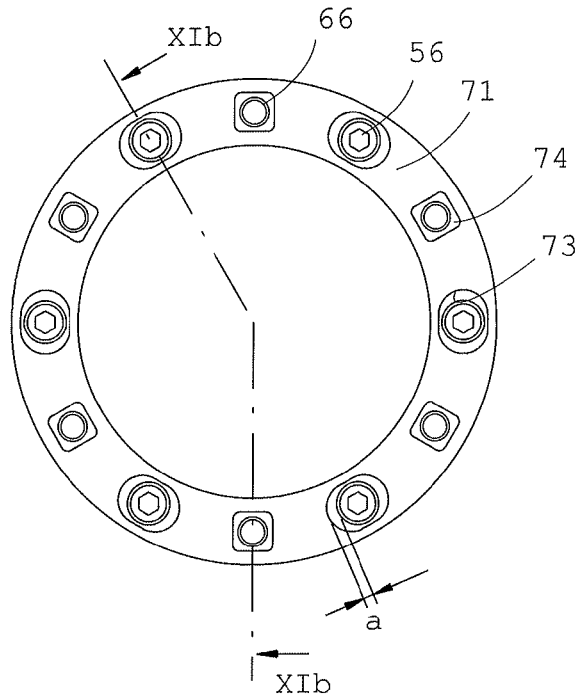
FIG. 11A is a side view from the wheel hub bearing section side, showing a state where bolts are inserted through a casing immobilizing member according to the embodiment in FIG. 10.

As shown in FIG. 11A, the ring plate 71 has holes 73 correspondingly to the bolts 56. The holes 73 are formed as long holes elongated in the directions of rotation.

Figure 11B:
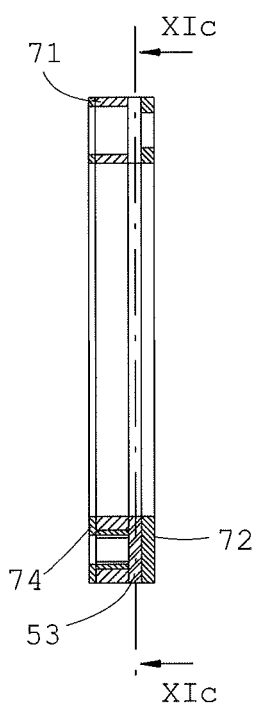
FIG. 11B is a vertical sectional view taken in line XIb-XIb in FIG. 11A, showing a state where the casing immobilizing member and the housing immobilizing member are bonded together by rubber.
Figure 11C:
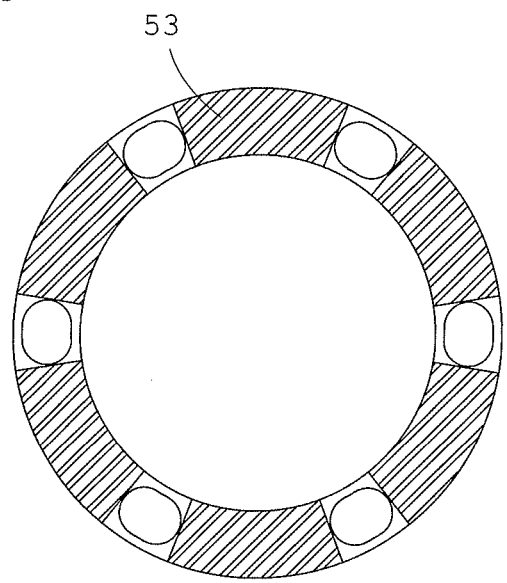
FIG. 11C is a sectional view taken in line XIc-XIc in FIG. 11B.

For a purpose of weight reduction, the ring plate 71 in FIG. 11 is made of a light-weight metal such as aluminum, with a steel threaded-piece 74 added by insert molding.

Figure 12:
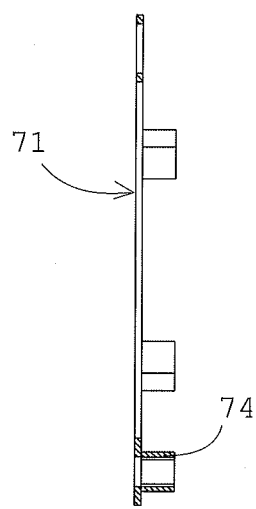
FIG. 12 is a vertical sectional view of another casing immobilizing member according to the embodiment in FIG. 10.

FIG. 12 shows an example of a thin ring plate 71 with the steel threaded-piece 74 welded, for example, thereto and then subjected to insert molding.

Preferably, the rubber utilized in the present invention is oil-resistant rubber such as nitrile rubber, hydrogenated nitrile rubber, acrylic rubber and fluoro-rubber.

In the first through the third embodiments, the speed reducer section B is provided by a cycloid reduction gear system. However, the speed reducer may be provided by a planetary gear system. If the speed reducer is provided by a planetary gear system, an inner gear of the planetary gear system provides the speed reducer section housing according to the present invention.

According to the first through the third embodiments, restoring force of the rubber member 53 keeps the outer pin housing 45 always at a predetermined position, maintaining a proper positional relationship thereof with respect to the casing 22b of the speed reducer section B.

Also, the arrangements prevent such components as the revolving member, the outer circumferential engager and the motion conversion mechanism, from being damaged by a large load or moment load which could be caused by turning, sudden acceleration/deceleration, etc.

Also, the arrangements eliminate rattling noise caused by the casing 22b and the outer pin housing 45 due to axial vibration when driving on, e.g., a rough terrain.

Now, a working principle of the above-described in-wheel motor driving device 21 will be described in detail.

In the motor section A, coils in the stator 23 is supplied with AC current for example to generate an electromagnetic force, which in turn rotates the rotor 24 which is provided by a permanent magnet or a magnetic member. If the frequency of the voltage which is supplied to the coil is increased, the rotor 24 rotates at an increased speed accordingly.

As the rotor 24 rotates, the motor-side rotation member 25 connected thereto rotates, which then causes the cycloid discs 26a, 26b to make their revolution around the rotation center of the motor-side rotation member 25. In this process, the outer pins 27 come into engagement with the curvy wave patterns of the cycloid discs 26a, 26b to cause the cycloid discs 26a, 26b to rotate in the opposite direction to the rotating direction of motor-side rotation member 25.

As the cycloid discs 26a, 26b make their rotational movement, the inner pins 31 which are inserted into the through-holes 30a make contact with inner wall surfaces of the through-holes 30a. In this movement, the revolving movements of the cycloid discs 26a, 26b are not transmitted to the inner pins 31 and only the rotational movements of the cycloid discs 26a, 26b are transmitted to the wheel hub bearing section C via the wheel-side rotation member 28.

In this process, the speed reducer section B reduces the speed of rotation of the motor-side rotation member 25 when the movement is transmitted to the wheel-side rotation member 28. Therefore, the arrangement allows the use of a low-torque high-rotation motor section A since the arrangement can transmits necessary torque to the driving wheel 14 even with such a type of motor section.

It should be noted here that the speed reducer section B of the configuration described above has a speed reduction ratio which can be calculated as $(ZA-ZB)/ZB$, where $ZA$ represents the number of the outer pins 27 whereas $ZB$ represents the number of wave patterns in the cycloid discs 26a, 26b. FIG. 2 shows an embodiment with $ZA=12$ and $ZB=11$, which gives a very large speed reduction ratio of 1/11.

As understood, an in-wheel motor driving device 21 which is compact and has a high speed-reduction ratio can be achieved by utilizing a speed reducer section B which can provide a large speed reduction ratio without requiring a multi-stage configuration. Also, the outer pins 27 are rotatable with respect to the outer pin holding portion 45, and the needle bearings 31a are used at places where the inner pins 31 make their contact with their respective cycloid discs 26a, 26b. These reduce frictional resistance and improve transmission efficiency in the speed reducer section B.

By utilizing the in-wheel motor driving devices 21 according to the above embodiments in the electric vehicle 11, it becomes possible to reduce an unsprung weight. As a result, it becomes possible to obtain an electric vehicle 11 which provides superior driving stability.

Also, in the embodiments described above, the speed reducer section B has two cycloid discs 26a, 26b which have a 180-degree phase difference from each other. However, the number of the cycloid discs may be any. For example, three cycloid discs may be used at a 120-degree phase difference.

Further in the embodiments described above, the motion conversion mechanism is constituted by the inner pins 31 fixed to the wheel-side rotation member 28 and the through-holes 30a, 30b provided at the cycloid discs 26a, 26b. However, the present invention is not limited by this, and a motion conversion mechanism of whatsoever configuration may be employed as far as it can transmit the rotation of the speed reducer section B to the wheel hub 32. For example, the motion conversion mechanism may be constituted by the inner pins fixed to the cycloid discs and holes in the wheel-side rotation member.

It should be noted here that in the embodiments described above, working of components are described with their rotation in focus. Actually, however, a force which includes a torque is transmitted from the motor section A to the driving wheel. Therefore, the driving force provided as a result of speed reduction described above has a high torque.

Also, in the above description of the embodiments, electric power was supplied to the motor section A to drive the motor section A, and the driving force from the motor section A was transmitted to the driving wheel 14. There may be an additional, inverse arrangement for situations where the vehicle is decelerating or running down on a slope, to pick a force from the driving wheel 14 and convert it by the speed reducer section B into a high-speed low-torque rotation and transmit this rotation to the motor section A, so that the motor section A can serve as a power generator. Further, there may be an arrangement to store the power generated in this way in a battery for later use to drive the motor section A for example, or operate other electric components on board.

In the embodiments described above, the cycloid discs 26a, 26b were supported by cylindrical roller bearings. However, the present invention is not limited by this. For example, the bearing may be replaced by slide bearings, deep-groove ball bearings, tapered roller bearings, needle bearings, self-aligning roller bearings, angular contact ball bearings, four-point contact ball bearings, or any other types of bearing regardless of whether they are slide bearings or rolling bearings, whether the bearings includes rollers or balls, or whether the bearings are single row type or double row type. The above applies to any other bearings which are disposed elsewhere in the device, so whatsoever types of bearing may be used.

In the above-described embodiments, the motor section A was provided by an axial gap motor. However, the present invention is not limited to this, and any suitable motor may be employed. For example, a radial gap motor which includes a stator fixed to a casing, and a rotor which is disposed inside the stator with a radial gap may be utilized.

Further, the electric vehicle 11 shown in FIG. 13 has the rear wheels 14 serving as driving wheels. However, the present invention is not limited to this, and the front wheels 13 may serve as driving wheels or the vehicle may be a four-wheel drive vehicle. It should be noted here that in the present description, the term "electric vehicle" means any type of vehicle which is driven by electricity. For example, therefore, hybrid cars and similar vehicles should also be included in this category.

Thus far, embodiments of the present invention have been described with reference to the drawings. However, the present invention is not limited to these illustrated embodiments. Any of these embodiments illustrated thus far may be modified or changed in many ways within the scope or within the equivalence of the present invention.

REFERENCE SIGNS LIST

11 electric vehicle
12 chassis
12a wheel housing
12b suspension system
13 front wheel
14 rear wheel
22 housing
22a motor section casing
22b speed reducer section casing
23 stator
24 rotor
25 motor-side rotation member
25a, 25b eccentric section
26a, 26b cycloid disc
27 outer pin
28 wheel-side rotation member
45 outer pin housing
50 end plate
51 casing immobilizing member
51a cylindrical section
51b flange
52 housing immobilizing member
52a cylindrical section
52b flange
53 rubber
54 bolt hole
56 bolt
57 cutout
58, 59 projection
61 bolt
66 bolt hole
71, 72 ring plate
73 hole
74 steel threaded-member

The invention claimed is:

1. An in-wheel motor driving device comprising a casing encasing therein: a motor section for generation of a driving force; and a speed reducer section for reducing speed of rotation generated by the motor section and then transmitting the rotation to a wheel hub bearing section connected to a wheel; the device further comprising a casing immobilizing member fixed to an inner surface of the casing; and a housing immobilizing member fixed to an outer surface of a speed reducer section housing; the casing immobilizing member and the housing immobilizing member being disposed between the casing and the speed reducer section housing and immobilized from rotation, via an elastic member.

2. The in-wheel motor driving device according to claim 1, wherein the elastic member is made of rubber, the rubber elastic member being bonded to the casing immobilizing member and to the housing immobilizing member.

3. The in-wheel motor driving device according to claim 1, wherein the casing immobilizing member is implemented by a large-diameter cylindrical section in an inner surface of the casing and a flange formed on an end surface of the large-diameter cylindrical section; the flange of the casing immobilizing member having a bolt hole for fixation to the casing; the housing immobilizing member being implemented by a small-diameter cylindrical section in an outer surface of the speed reducer section housing and a flange formed on an end surface of the small-diameter cylindrical section; the flange of this housing immobilizing member having a bolt hole for fixation to the speed reducer section housing; the large-diameter cylindrical section and the small-diameter cylindrical section being bonded to each other by vulcanization of the rubber which constitutes the elastic member.

4. The in-wheel motor driving device according to claim 3, wherein the bolt for fixation to the flange of the housing immobilizing member is provided by a hex-key bolt.

5. The in-wheel motor driving device according to claim 4, wherein the flange of the casing immobilizing member has a cutout formed correspondingly to the hex-key bolt for allowing the flange of the casing immobilizing member and the hex-key bolt to make contact with each other.

6. The in-wheel motor driving device according to claim 3, wherein the large-diameter cylindrical section in the inner surface of the casing has an inner diameter side formed with a plurality of projections whereas the small-diameter cylindrical section has an outer diameter side formed with an identical number of projections with those on the large-diameter cylindrical section, being spaced therefrom.

7. An in-wheel motor driving device comprising: a casing encasing therein a motor section for generation of a driving force and a speed reducer section for reducing speed of rotation generated by the motor section and then transmitting the rotation to a wheel hub bearing section connected to a wheel; wherein the casing axially faces a housing of the speed reducer section, sandwiching therebetween a ring plate bolted to the casing and a ring plate bolted to the housing of the speed reducer section; the two ring plates being bonded to each other by vulcanization of rubber.

8. The in-wheel motor driving device according to claim 7, wherein the bolt for fixing the ring plate to the housing of the speed reducer section is provided by a hex-key bolt.

9. The in-wheel motor driving device according to claim 8, wherein the ring plate bolted to the housing of the speed reducer section has a hole corresponding to the hex-key bolt for the hex-key bolt and the hole to make contact with each other upon application of an excessive torque.

10. The in-wheel motor driving device according to claim 9, wherein the hole is a long hole elongated in a direction of rotation.

11. The in-wheel motor driving device according to claim 7, wherein the two rubber-vulcanized ring plates are sandwiched between the housing of the speed reducer section and the casing of the motor section, with one of the two ring plates being fixed to the housing of the speed reducer section while the other being fixed to the casing of the motor section.

12. The in-wheel motor driving device according to claim 7, wherein at least one of the ring plates is provided by an aluminum member with a steel threaded-piece added thereto in insert molding.

13. The in-wheel motor driving device according to claim 2, wherein the rubber is provided by an oil-resistant rubber such as nitrile rubber, hydrogenated nitrile rubber, acrylic rubber and fluoro-rubber.

14. The in-wheel motor driving device according to claim 1, wherein the speed reducer section is provided by a cycloid reduction gear system, and the housing of the speed reducer section is provided by an outer pin housing of the cycloid reduction gear system.

15. The in-wheel motor driving device according to claim 1, wherein the speed reducer section is provided by a planetary gear system, and the housing of the speed reducer section is provided by an inner gear of the planetary gear system.

16. The in-wheel motor driving device according to claim 7, wherein the rubber is provided by an oil-resistant rubber such as nitrile rubber, hydrogenated nitrile rubber, acrylic rubber and fluoro-rubber.

17. The in-wheel motor driving device according to claim 7, wherein the speed reducer section is provided by a cycloid reduction gear system, and the housing of the speed reducer section is provided by an outer pin housing of the cycloid reduction gear system.

18. The in-wheel motor driving device according to claim 7, wherein the speed reducer section is provided by a planetary gear system, and the housing of the speed reducer section is provided by an inner gear of the planetary gear system.

* * * * *